(12) United States Patent
Al-Anzi

(10) Patent No.: US 10,085,394 B2
(45) Date of Patent: Oct. 2, 2018

(54) PLANTER SYSTEM USING WASTE MATERIALS

(71) Applicant: KUWAIT UNIVERSITY, Safat (KW)

(72) Inventor: Fawaz Shukhier Al-Anzi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 216 days.

(21) Appl. No.: 15/209,536

(22) Filed: Jul. 13, 2016

(65) Prior Publication Data

US 2018/0014482 A1    Jan. 18, 2018

(51) Int. Cl.
| | |
|---|---|
| A01G 13/02 | (2006.01) |
| A01G 9/02 | (2018.01) |
| A01G 25/00 | (2006.01) |
| A01G 27/02 | (2006.01) |
| A01G 27/00 | (2006.01) |
| A01G 9/00 | (2018.01) |

(52) U.S. Cl.
CPC .............. *A01G 27/02* (2013.01); *A01G 9/00* (2013.01); *A01G 13/0237* (2013.01); *A01G 13/0281* (2013.01); *A01G 27/008* (2013.01)

(58) Field of Classification Search
USPC ........... 47/65.5, 65, 79, 66.6, 21.1, 32, 32.4, 47/32.5, 32.6, 32.7, 32.8, 33, 65.7, 66.7
See application file for complete search history.

(56) References Cited

U.S. PATENT DOCUMENTS

| | | | | |
|---|---|---|---|---|
| 652,736 | A * | 6/1900 | Balsley .............. | A01G 13/0243 47/30 |
| 2,105,800 | A | 1/1938 | Watkins | |
| 3,038,512 | A * | 6/1962 | Staton ...................... | A01G 9/02 220/660 |
| 3,618,260 | A * | 11/1971 | Convey, Jr. et al. ........ | A01G 27/006 47/32 |
| 3,896,586 | A | 7/1975 | Caldwell | |
| 4,791,754 | A * | 12/1988 | Demars, Jr. .............. | A01G 9/12 47/29.2 |
| 5,095,651 | A * | 3/1992 | Figueroa .................. | A01G 9/02 47/65.7 |

(Continued)

FOREIGN PATENT DOCUMENTS

| | | | | |
|---|---|---|---|---|
| CA | 2116901 | * | 4/1995 | ............ A01G 29/00 |
| CA | 2116901 | | 9/1995 | |

(Continued)

*Primary Examiner* — Andrea M Valenti
(74) *Attorney, Agent, or Firm* — Richard C. Litman

(57) ABSTRACT

The planter system using waste materials repurpose waste materials to construct a self-irrigating planter that promotes plant growth in a protective environment. The planter system includes a water reservoir constructed from scrap tire defining a hollow interior serving as water storage, the reservoir being buried in soil. A condensation funnel having a sloped condensation skirt extends into the center opening of the scrap tire to direct condensate into the water reservoir. A root ball cover made from scrap newspaper covers the root system of a plant, and the plant is buried in the center opening of the scrap tire. A soil protection cover is placed atop the root ball cover to protect the soil of the root ball, and a support tube extends therefrom to protect the stem of the plant from environmental conditions. A valve regulates delivery of water to the reservoir. Most components are made from scrap plastic.

9 Claims, 2 Drawing Sheets

(56) References Cited

U.S. PATENT DOCUMENTS

| | | | |
|---|---|---|---|
| 5,383,744 A | | 1/1995 | Hendershot |
| 5,647,169 A | * | 7/1997 | Bui .................. A01G 13/10 47/33 |
| 5,709,049 A | | 1/1998 | Baird |
| 6,055,773 A | * | 5/2000 | Yang .................. A01G 9/02 119/61.1 |
| 6,453,607 B1 | | 9/2002 | Dewey |
| 6,976,334 B1 | * | 12/2005 | Bowditch .......... A01G 13/0281 47/29.1 |
| 8,347,927 B2 | * | 1/2013 | Mitchell ............. A01G 27/00 141/337 |
| 8,381,436 B2 | * | 2/2013 | Harley .............. A01G 25/00 47/30 |
| 8,826,588 B1 | * | 9/2014 | MacKichan .......... A01G 9/12 47/30 |
| 9,456,560 B1 | * | 10/2016 | MacKichan .......... A01G 29/00 |
| 2008/0190017 A1 | | 8/2008 | Hoff |

FOREIGN PATENT DOCUMENTS

| | | | | |
|---|---|---|---|---|
| DE | 3718288 A1 | * | 12/1988 | ............. A01G 31/02 |
| DE | 3729218 A1 | * | 3/1989 | ............... A01G 9/02 |
| JP | 2001-218523 | * | 8/2014 | ............... A01G 1/00 |

* cited by examiner

PLANTER SYSTEM USING WASTE MATERIALS

BACKGROUND OF THE INVENTION

1. Field of the Invention

The present invention relates to plant husbandry, and particularly to a planter system using waste materials as building materials for constructing an economic and environmentally friendly, self-sustaining irrigator that protects plants and promote growth, especially in arid and/or harsh environments.

2. Description of the Related Art

Plant growth in arid regions, such as the deserts of the Middle East, is very difficult, even for the indigenous species. The sparse annual rainfall and fresh water sources, as well as harsh winds, contribute to the lack of verdant vegetation. Life, however, is very tenacious. Young plants and shoots still manage to find footing in a variety of locales. Although sparse, these young plants have a greater chance of survival in harsh environments with some human intervention, at least through the earlier stages of growth.

Current advances in technology have overcome some of these issues, to an extent. Improved desalination plants and processes, as well as distribution infrastructure, have made potable water more readily available to the masses. In arid regions, however, the water for consumption may be costly to produce and distribute. Moreover, technical advances also produce additional waste. Landfills and other waste disposal sites are steadily being filled with waste that can be readily recycled or repurposed, such as scrap tires, plastics, and newspapers. Besides the real estate required for the landfills and the like, the waste can be harmful to the environment.

Thus, a planter system using waste materials solving the aforementioned problems is desired.

SUMMARY OF THE INVENTION

The planter system using waste materials repurpose waste materials to construct a self-irrigating planter that promotes plant growth in a protective environment. The planter system includes a water reservoir constructed from scrap tire with a hollow interior serving as water storage, the reservoir being buried in soil. A condensation funnel having a sloped condensation skirt extends into the center opening of the scrap tire to direct condensate into the water reservoir. A root ball cover made from scrap newspaper covers the root system of a plant, and the plant is buried in the center opening of the scrap tire. A soil protection cover is placed atop the root ball cover to protect the soil of the root ball, and a support tube extends therefrom to protect the stem of the plant from environmental conditions. A valve regulates delivery of water to the reservoir. Most components are made from scrap plastic.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
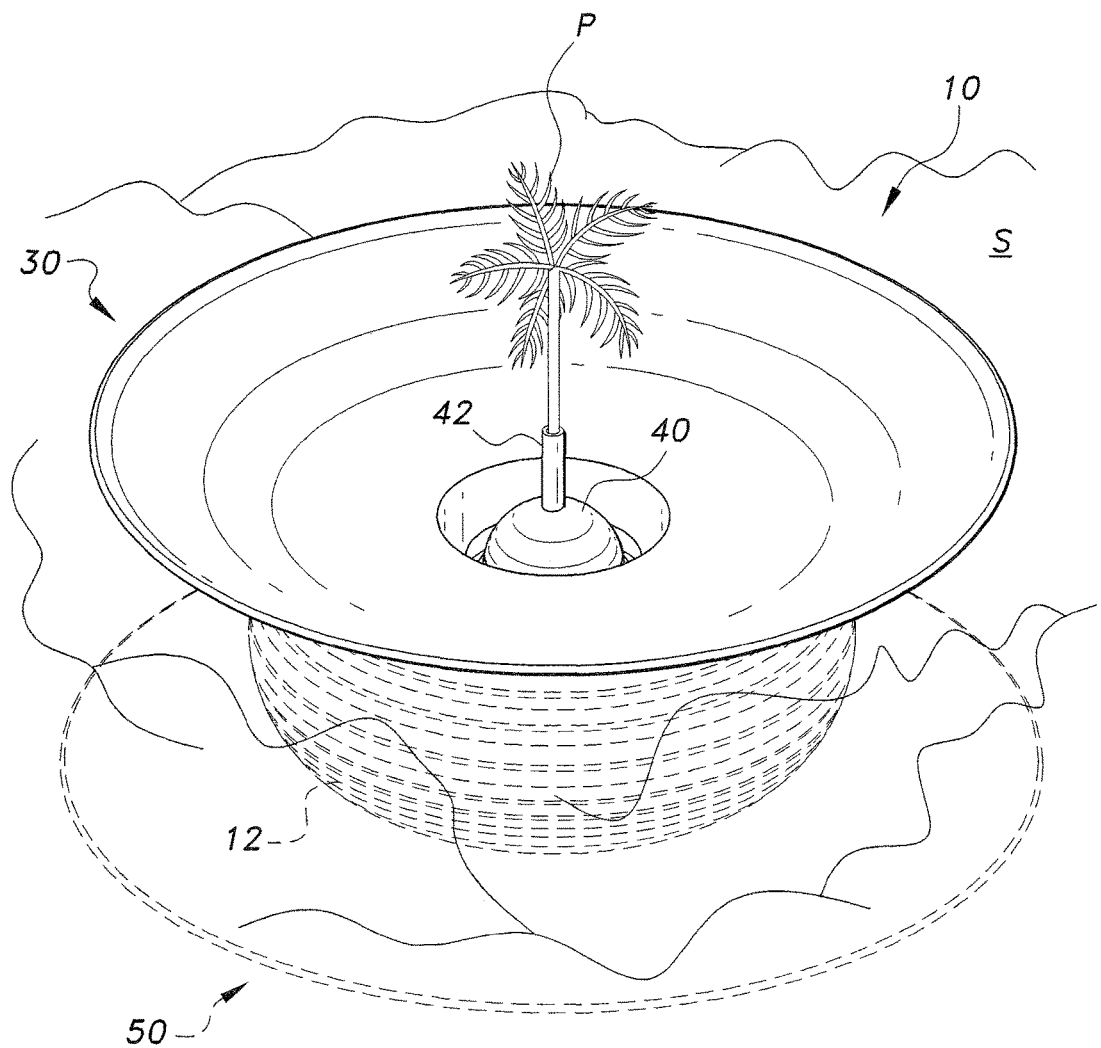
FIG. 1 is an environmental, perspective view of a planter system using waste materials according to the present invention.

The planter system using waste materials, generally referred to by the reference number 10 in the drawings, provides a self-sustaining irrigation system and planter that promotes healthy plant growth in a protected, safe environment. The planter system 10 includes a water reservoir 12 buried in the soil of the target site. A seedling plant P is planted in the middle of the water reservoir 12.

The water reservoir 12 is preferably a scrap tire, where the tubular hollow interior defined by the inner wall of the scrap tire serves as a container for water W to be introduced and stored therein. Use of scrap tires eliminates some of the discarded waste accumulating in local landfills. The water reservoir 12 sits horizontally beneath the top surface of the soil S a predetermined depth. The buried water reservoir 12 is isolated from the environment and exposure, which substantially reduces water loss due to evaporation.

The seedling plant P includes a root ball wrap 20 covering the root ball RB, i.e., the root and soil surrounding the root of the seedling plant P. The root ball wrap 20 is preferably constructed from newspaper and the like, which is another source of reusable waste. Besides protecting the root system of the seedling plant P, the root ball wrap 20 also serves as a biodegradable irrigation regulator that assists in insuring the root will not be supplied with too much water W, which could drown the seedling plant P, or too little water W from the water reservoir 12, which can inhibit growth. In other words, the root ball wrap 20 helps to control capillary action between the roots and the water supply.

Figure 2:
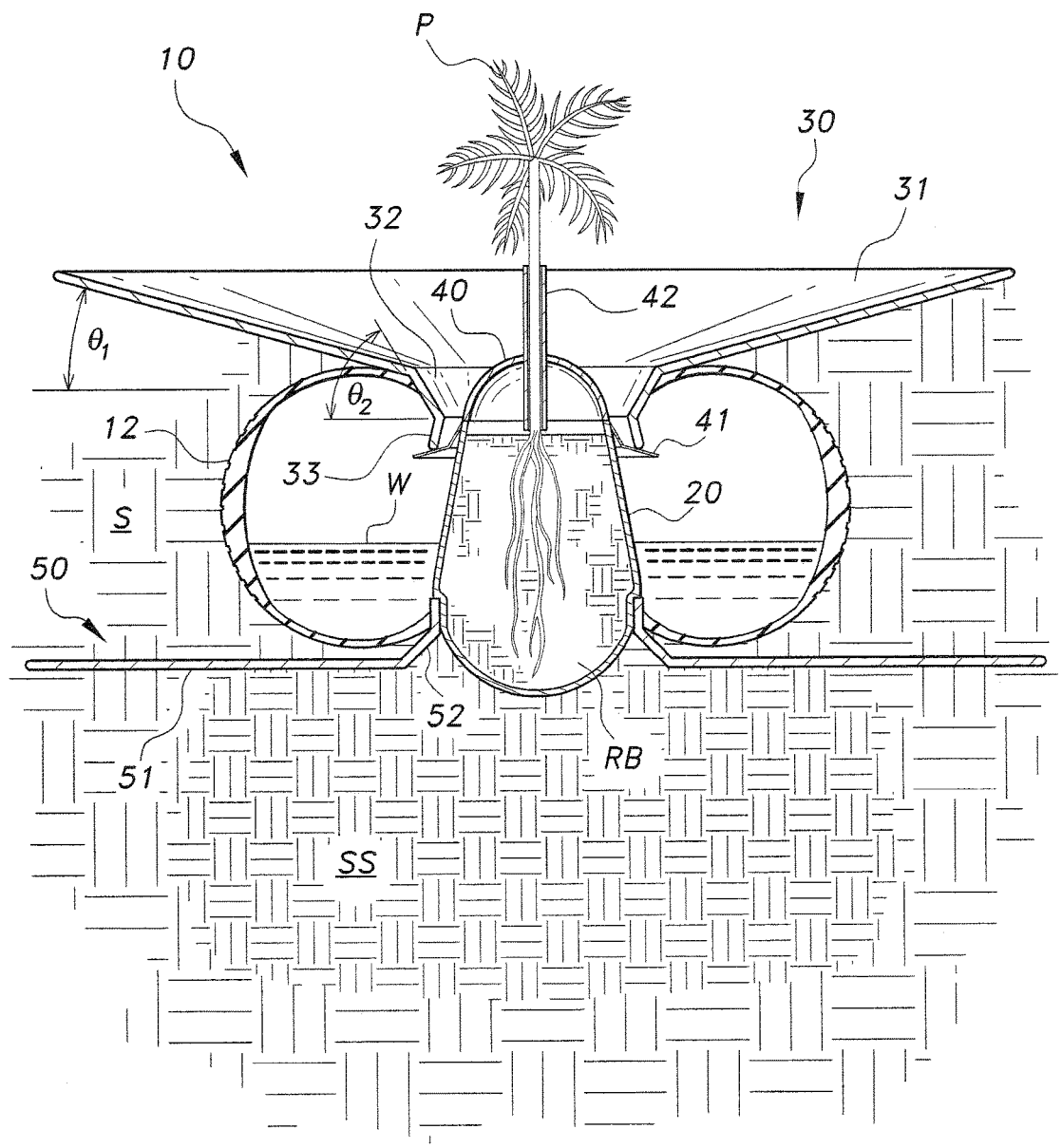
FIG. 2 is a diagrammatic side view in section of the planter system of FIG. 1.

The irrigation for the planter system 10 may be facilitated by several different means. For example, the water reservoir 12 may be filled with water W prior to planting the seedling plant P so that a ready supply is immediately available, or the seedling plant P may be regularly watered either manually or by automatic means. The planter system 10, however, also includes a self-sustaining irrigation system. As best seen in FIG. 2, this irrigation system includes a condensation funnel 30 surrounding a center or circular opening of the water reservoir 12, i.e., the hole in the scrap tire. The condensation funnel 30 is preferably constructed from reusable plastic sheets, such as plastic bags, tarp, and the like. The condensation funnel 30 comprises a generally annular condensation skirt 31 extending downward towards the top of the circular opening of the water reservoir 12 at a first angle $\theta_1$. This angle $\theta_1$ is preferably about 30° with respect to horizontal. An annular lip 32 contiguous with the condensation skirt 31 extends into the circular opening of the water reservoir 12 a predetermined depth at a second angle $\theta_2$ to form a relatively steep incline into the circular opening, the second angle $\theta_2$ being greater than the first angle $\theta_1$ with respect to horizontal. The lip 32 includes a flared section 33 that extends outward towards the hollow tubular interior of the scrap tire from the distal end of the lip 32. The lip 32 and the flared section 33 thereof define or form a spout of the condensation funnel 30.

The condensation skirt 31 provides a relatively large surface area for condensate to form thereon from the surrounding atmosphere during normal night and day cycles. The slope of the condensation skirt 31 insures the condensate funnels into the water reservoir 12, while the lip 32 and the flared section 33 exploit the natural capillary property of water W to direct the condensate towards the hollow portion of the scrap tire. The surface area of the condensation skirt 31 may vary to insure a suitable quantity of water W is supplied to the water reservoir 12, and thereby to the seedling plant P. The condensation funnel 30 will, of course, enable rainwater to flow into the water reservoir 12 as well.

It is to be noted that while the condensation funnel 30 has been shown and described as being generally a uniform circular cone, the dimensions and configuration of the funnel 30 may be vary, depending on the available scrap plastic sheets. The plastic sheets can be laid in any manner, e.g., complete or incomplete, regular or irregular circles, squares, rectangles, etc., to form a funnel into the opening of the scrap tire with the prescribed angles, so long as the resultant funnel can supply the seedling plant P with suitable quantity of water W. The condensation skirt 31 may be flat or curved. Moreover, the bottom of the condensation skirt 31 may be provided with a thermal insulation coating to reduce thermal exchange between ambient temperature and the inner temperature of the water reservoir 12. This helps to maintain relatively cool temperatures within the water reservoir 12.

Apart from an adequate supply of water, the seedling plant P must also be protected from harsh environmental conditions to increase survivability. In arid desert climes, harsh wind storms can strip the exposed soil of a plant. To prevent such an occurrence, the planter system 10 includes a soil protection cover 40 mounted atop the root ball or root ball wrap 20. The soil protection cover 40 is generally dome-shaped to cover any root ball soil that may be exposed to the environment. The soil protection cover 40 is preferably constructed from scrap plastic.

As a further protective measure, the planter system 10 may be provided with an elongate support tube 42 inserted through an opening in the soil protection cover 40. In use, the support tube 42 surrounds the stem of the seedling plant P, which protects the body of the plant from harsh winds that may potentially uproot the plant. The support tube 42 may be constructed from scrap plastic tubes, scrap cardboard tubes, and the like. The support tube 42 may also be formed from scrap lengths of plastic or stiff paper wrapped into a tubular shape. The tube may be whole or split, the latter enabling a more easy installation around the stem.

The soil protection cover 40 also includes a generally annular regulator flange 41 extending downward into the opening of the scrap tire and outward towards the hollow interior of the scrap tire past the end of the flared section 33 and touching the same. This configuration forms a temporary well between the flared section 33 and the regulator flange 41 due to spacing between the two features. The regulator flange 41 is preferably constructed from resilient plastic so that as condensate water accumulates within the temporary well, the weight of accumulated water bends the regulator flange 41 down to release the accumulated water into the water reservoir 12. Thus, the regulator flange 41 serves as a type of valve that controls the quantity of water being supplied into the water reservoir 12, where the valve is closed when the regulator flange 41 touches the end of the flared section 33 and open when the regulator flange 41 bends away from the flared section 33.

The planter system 10 also includes a moisture barrier 50 coupled to the bottom of the water reservoir 12. The moisture barrier 50 assists in preventing water loss by directing excess water from the water reservoir 12 into the subsoil SS below the root. Thus, water may be readily supplied to the seedling plant P, even on extremely hot days. The moisture barrier 50 includes one or more elongate plastic sheets 51 disposed around a bottom sidewall of the scrap tire. A lip section 52 extends upward from one end of the plastic sheet 51 into the bottom of the circular opening. The lip section 52 is secured to the bottom bead of the scrap tire by any conventional means, such as adhesives, fasteners, welds, and the like.

Thus, it can be seen that the planter system 10 using waste materials provides an economical and environmentally friendly solution for promoting plant growth. The isolated water reservoir 12 enables a ready supply of water for the seedling plant P, and the condensation funnel 30 provides a self-sustaining source of water for the water reservoir 12. The soil protection cover 40 and the support tube 42 protect the soil and the plant from harsh environmental conditions, respectively. Moreover, most, if not all, of the components of the planter system 10 are constructed from available waste material, which is cost effective and substantially reduces waste and environmental impact.

It is to be understood that the present invention is not limited to the embodiments described above, but encompasses any and all embodiments within the scope of the following claims.

I claim:

1. A planter system using waste materials, comprising:
a water reservoir adapted to be buried horizontally in soil, the water reservoir being a scrap tire having a hollow interior for storing water therein and a center opening;
a condensation funnel disposed in the center opening of the scrap tire, the condensation funnel directing water condensate into the water reservoir;
a root ball wrap adapted to cover a root ball of a plant, the root ball wrap facilitating planting of the plant in the center opening of the scrap tire;
a soil protection cover disposed atop the root ball wrap, the soil protection cover protecting exposed surrounding soil of the root ball from harsh environmental conditions;
a valve coupled to the soil protection cover, the valve controls delivery of water to the water reservoir, wherein the valve comprises a regulator flange extending downward from the soil protection cover towards the hollow interior and touching an edge of the condensation funnel, thereby closing the valve, the regulator flange and the condensation funnel being spaced apart to form a temporary well for accumulation of water therein, the regulator flange resiliently bending under weight of accumulated water, thereby opening the valve to facilitate egress and delivery of accumulated water to the water reservoir; and
an elongate support tube coupled to the soil protection cover, the support tube being adapted to cover a stem of the plant for support and protection from harsh environmental conditions.

2. The planter system according to claim 1, wherein said condensation funnel comprises:
a condensation skirt surrounding the center opening of said scrap tire, the condensation skirt having a surface area for condensation of water thereon, the condensation skirt extending towards the center opening at a first angle with respect to horizontal at a ground surface of the soil;
a lip contiguous with the condensation skirt and extending into the center opening of said scrap tire to a predetermined depth at a second angle to form a relatively steep incline into the center opening, the second angle being greater than the first angle with respect to horizontal; and a flared section extending outward towards the hollow interior from a distal end of the lip, the lip and the flared section defining a spout of said condensation funnel.

3. The planter system according to claim 2, wherein said condensation funnel is constructed from scrap plastic.

4. The planter system according to claim 1, wherein said soil protection cover is substantially dome-shaped to conform to a top portion of said root ball wrap.

5. The planter system according to claim 4, wherein said soil protection cover is constructed from scrap plastic.

6. The planter system according to claim 1, wherein said regulator flange is constructed from resilient scrap plastic.

7. The planter system according to claim 1, wherein said support tube is constructed from scrap plastic.

8. The planter system according to claim 1, further comprising a moisture barrier coupled to a bottom sidewall of said scrap tire, the moisture barrier preventing excessive water loss by directing excess water from said water reservoir into subsoil below the root ball of the plant.

9. The planter system according to claim 8, wherein said moisture barrier is constructed from scrap plastic.

* * * * *